No. 885,473. PATENTED APR. 21, 1908.
F. J. HEYBACH.
WEIGHING APPARATUS.
APPLICATION FILED SEPT. 11, 1906. RENEWED AUG. 19, 1907.
3 SHEETS—SHEET 1.
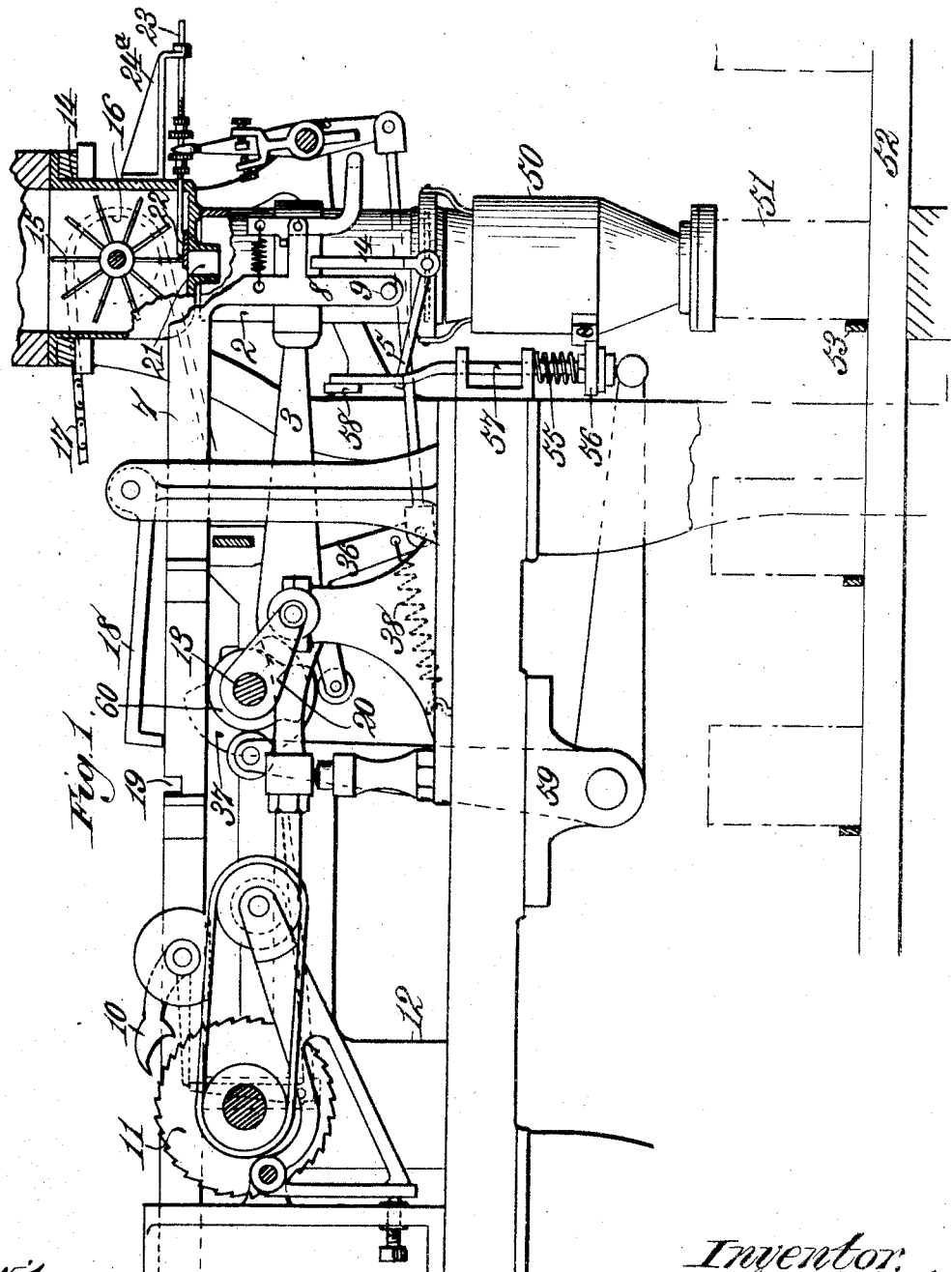
Witnesses.
Inventor:
Frederick J. Heybach,
By James L. Norris
Atty.

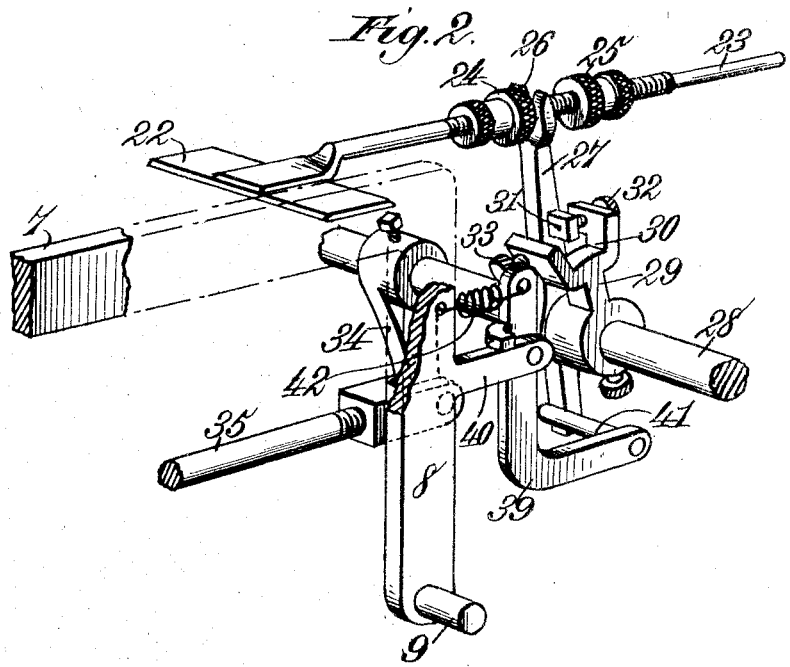

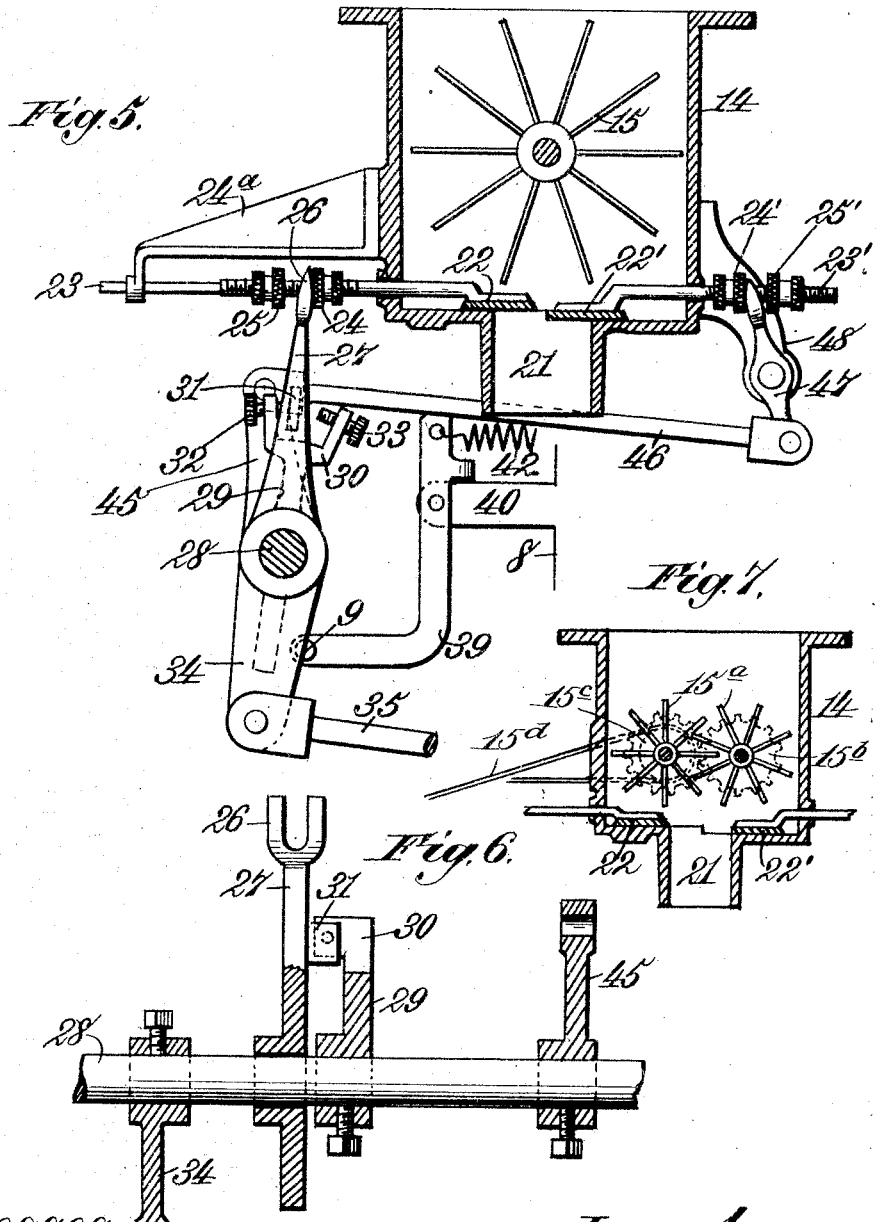

UNITED STATES PATENT OFFICE.

FREDERICK J. HEYBACH, OF SAVANNAH, GEORGIA, ASSIGNOR OF ONE-HALF TO MOREHOUSE MANUFACTURING CO., OF SAVANNAH, GEORGIA, A CORPORATION OF GEORGIA.

WEIGHING APPARATUS.

No. 885,473.  Specification of Letters Patent.  Patented April 21, 1908.

Application filed September 11, 1906, Serial No. 334,180. Renewed August 19, 1907. Serial No. 389,250.

*To all whom it may concern:*

Be it known that I, FREDERICK J. HEYBACH, a citizen of the United States, residing at Savannah, in the county of Chatham and State of Georgia, have invented new and useful Improvements in Weighing Apparatus, of which the following is a specification.

This invention relates to weighing apparatus of the same general type as that set forth in Letters Patent No. 791,342 granted to me on May 30, 1905, and to which reference may be had.

The present application covers certain matters disclosed but not claimed in an application for patent entitled "weighing and can filling apparatus," filed April 11, 1905, and Serial No. 311,157.

The present invention relates particularly to a simple and effective means for supplying the bucket of the weighing machine with a stream of material to make up the load therein, and for quickly and accurately cutting off said stream for which purpose, as will hereinafter appear, one or a plurality of valves may be utilized.

While I have designated the invention as weighing apparatus some of the features thereof may be utilized in machines where weighing is not actually done.

In the drawings accompanying and forming a part of this specification, I show in detail certain forms of embodiment of the invention, which, to enable those skilled in the art to practice said invention, will be fully set forth in the following description, while the novelty of said invention will be included in the claims succeeding said description.

Referring to said drawings: Figure 1 is a side elevation of weighing apparatus involving my invention. Fig. 2 is a perspective view of a supply controlling valve and the improved actuating mechanism therefor. Fig. 3 is a sectional detail hereinafter more particularly described of a part of the actuating mechanism shown in detail in Fig. 2. Fig. 4 is a detail view in side elevation of a sprocket wheel, and Fig 4ᵃ is a top plan view of said sprocket wheel. Fig. 5 is a sectional view of a supply hopper having compound valve mechanism and actuating mechanism adapted thereto. Fig. 6 is a view corresponding to Fig. 3 of certain of the parts shown in Fig. 5. Figs. 2 to 6 inclusive show the parts on different scales, all larger than that upon which Fig. 1 is drawn. Fig. 7, which is also on a larger scale than Fig. 1, shows in sectional elevation a slight modification of the feed controlling means.

Like characters refer to like parts throughout the several figures.

In Fig. 1 of the drawings I have shown a weighing apparatus which involves the mechanism shown in the Letters Patent hereinbefore referred to and for brevity I will not set forth in full the construction and mode of operation of the parts represented herein and shown in the Letters Patent, for, as will be understood, the invention lies principally in the means for supplying a stream of material to the bucket of a weighing machine or equivalent receptacle and in effectively controlling such stream.

Referring now more particularly to Fig. 1, the numeral 2 designates the bucket of a weighing machine; this bucket being suspended by a scale beam as 3, said bucket and scale beam presenting what is known as weighing mechanism. The bucket 2 is equipped at its bottom with a discharge valve or closer as it is sometimes known, with which are fixedly connected the two arms 4 and 5, the arm 4 being operable by a member as 7 to open said valve or closer for the purpose of discharging the contents of said bucket, while the arm 5 is operable by said device 7 to shut said valve or closer.

The part 7 is intermittently reciprocated and it has a downward projection 8 at one end shown at the right in Fig. 1, which projection is provided with a pin 9 for alternately engaging the two arms 4 and 5. The member 7 is moved forward by the engagement of a pawl 10 thereon with the teeth of a power operated ratchet wheel 11. The framework of the machine which supports the different parts of the apparatus is designated in a general way by 12 and it has suitable bearings for carrying the intermittently rotative shaft 13. The shaft 13 may be operated in the manner shown in the Letters-Patent, or as illustrated in the application, both hereinbefore referred to.

The framework of the machine carries a hopper as 14 in which is rotative a force feeder 15 so as to adapt the apparatus to the weighing of materials which do not flow freely. The shaft of this force feeder carries a sprocket wheel as 16 having a frictional fit on the shaft of the feeder, which sprocket wheel is driven by a sprocket chain as 17 (see Fig. 1). Should the force feeder encounter any obstruction in the hopper 14 no damage can result owing to the fact that the sprocket wheel 16 can turn on the force feeder shaft. Under normal conditions the force feeder effectually loosens up the material in the hopper and for this purpose is continuously operable.

Upon the framework is pivotally mounted a latch 18 represented as being of the gravitative type and the toothed or working end of which when the reciprocatory member 7 has made its full advancing or working stroke is adapted to enter a notch 19 in said member 7 to prevent rebound thereof. On the intermittently rotative shaft 13 is carried an arm as 20 which is found in the application and Letters-Patent to which reference has been hereinbefore made. The primary purpose of this arm 20 is to return the member 7 to its initial position and just before this function is performed the free end of the arm 20 strikes the latch 18 and disengages the same from said part 7, whereby the latter can be given its return stroke.

The hopper 14 has on its under side a spout 21 for delivering material directly into the bucket 2 and movable across the bottom of the hopper 14 and necessarily across the top of this spout 21 is a valve 22. The valve, therefore, is of the sliding type, it being shown as made in the form of a plate provided with an outwardly extending and elongated stem 23 guided for longitudinal movement by a bracket as 24ª fastened to the hopper 14.

On the stem 23 at some convenient place thereof are two projections 24 and 25 which may consist of collars adjustable longitudinally of said stem 23. These two adjustable collars are ordinarily made in the form of nuts, the stem 23 between them being straddled by the forked end 26 of a lever 27 loosely supported between its ends by the shaft 28, said shaft being sustained by the framework of the machine in any suitable way. When the lever 27 strikes against the collar 24 the valve 22 will be closed, while when said lever strikes against the collar 25 said valve will be opened. The valve as will hereinafter appear has two distinct and separate stages of operation, it being moved from its wide open position during which the maximum stream flows into the bucket 2 to a drip position. When the valve is in the drip position a reduced stream flows from the hopper 14 into the bucket 2 and when the load in the bucket is completed or made up said valve is given its final movement to cut off the drip stream, the load in the bucket being afterwards discharged and these several operations are secured by power, the parts being so timed in their actions as to properly obtain the same.

I have shown as fastened to the shaft 26 an arm 29 constituting what might be considered a primary actuator for the lever 27. The upper portion of this arm is bifurcated as at 30, the lateral projection 31 on the lever 27 being disposed between the branches of said bifurcation and being alternately engageable by the projections 32 and 33 on said branches, these projections being adjustable and consisting preferably of screws tapped through the said branches. The screw 32 engages the projections 31 in a direction to impart to the valve 22 through the intermediate mechanism its primary closing movement while the screw 33 by engaging said projection 31 opens said valve 22 through said intermediate mechanism.

There is shown as fastened to the shaft 28 and as depending therefrom an arm 34 to which is jointed the forward end of the link 35, the rear end of said link being similarly connected to the angle lever 36 supported by the framework of the machine and operable in one direction by the cam 37 on the intermittently rotative shaft 13. Said angle level is shown as operated in opposition to the cam 37 by a spring 38.

There is a secondary actuator for the lever 27 and the same may consist of a part as 39 represented as consisting of an L-shaped lever pivotally supported between the ends of its vertical arm upon the forward extension 40 of the downward projection 8. The horizontal arm of this actuator 39 is equipped with a pin 41 engageable against the lower arm of the lever 27 for swinging said lever 27 in such way as to give the valve 22 its final closing movement. This actuator 39 is yieldingly mounted so as to avoid injury to any of the parts should the valve 22 be blocked accidentally in closing. To secure this result a coiled spring as 42 may be interposed between the upper end of the actuator 39 and the downward projection 8, all as shown clearly in Fig. 2.

When the member 7 is moved forward, the bucket 2 at this time being in position to and receiving the full volume of the supply stream from the hopper 14, the shaft 13 is thrown in action, all as set forth in Letters-Patent hereinbefore referred to and during the rotation of said shaft 13 the cam 37 will operate the angle lever 26 in a direction to thrust the link 35 to the right in Fig. 1. The arm 34 is moved in a corresponding direction while the arm 29 is moved to the left in said Fig. 1 so as to carry the screw 32 against the projection 31 for rocking the upper arm of the lever 27 to the left in said Fig. 1. The upper end of the lever 27 will on this motion engage the collar 24, and thereby move the valve 22 to its drip position as also shown in said Fig. 1 to permit a reduced or drip stream to flow into the bucket 2. When the load in said bucket is completed the member 7 will have reached the limit of its forward motion and just before this takes place the pin 41 strikes the lower branch of the lever 27 so that the valve 22 can by the lever 27 striking the collar 24 be given its final closing movement. The parts are so timed as to secure the operations outlined and there is lost motion between the actuator 29 and lever 27 and between said lever 27 and the two collars 24 and 25. The amount of this lost motion may be adjusted by means of the screws 32 and 33 and collars 24 and 25 so as to secure with precision the action of the valve 22.

The opening of the valve 22 is secured primarily by the spring 38, which spring when the lever 36 is under the action of the cam 37 is tensioned so that when the lever 36 is released by the cam 37 the lever can be returned to its original position and on such movement the rod or link 35 is drawn to the left in Fig. 1, the arm 34 being correspondingly moved so as to actuate the actuator 29 which in turn swings the lever 27 in a direction to move the valve 22 to its open position. The lever 27 for this purpose acts against the collar 25.

In Figs. 5 and 6 I show a construction wherein there are two valves, one valve as 22 hereinbefore described, and a second valve 22'. Those parts which appear in Figs. 5 and 6 and which have been hereinbefore described will be given corresponding characters. In Fig. 5, for example, I show the actuators 29 and 39, the lever 27, the arm 34, link 35, valve stem 23 and adjustable collars 24 and 25. The shaft 28 has fixed thereto the arm 45, to the upper end of which is connected one end of a link 46, the opposite end of said link being pivoted to the lower arm of a lever 47 fulcrumed between its ends upon a bracket 48 on the hopper 14, the upper end of said lever 47 being adapted to alternately engage the adjustable collars 24' and 25' upon the stem 23' of the valve 22'. When the link 35 is advanced the two valves 22 and 22' are moved toward each other through the intermediate parts to the position shown in Fig. 5. Upon the return movement of said link 35 the two valves will be simultaneously opened. When the link 35 completes its advancing motion to cause the simultaneous closing toward each other of the two valves 22 and 22' the valve 22 will not have completed its forward movement, although the valve 22' will have. The consequence, therefore, is that a reduced stream can flow from the hopper through the space between the discharge edges or lips of the two valves. This reduced stream is cut off by the action of the valve 22, which action is caused by the part 39 striking against the lower arm of the lever 27 which acts against said valve 22 as hereinbefore fully described. The valves 22 and 22' operate in superposed planes, by reason of which the discharge end of the valve 22 when closed may overlap the corresponding end of the valve 22' to effectually cut off the delivery of material from the hopper 14. The form of invention illustrated in Figs. 5 and 6 is adapted especially for controlling streams of large volume.

The loads of material discharged from the bucket 2 enter a hopper as 50 for delivery thereby into cans as 51 movable along a way as 52 by conveying mechanism including in its construction slats as 53.

The hopper 50 and the actuating means therefor constitute no part of the present invention, but are claimed in the application to which I have hereinbefore referred.

The hopper 50 is mounted for rising and falling motion, it being thrust downward by a spring as 55 bearing against a bracket as 56 connected with the hopper and surrounding the upwardly extending rod 57, the upper end of which is provided with a cross piece 58 to engage the forward end of the beam 3 to prevent the premature dropping of said end. When the hopper 50 is lowered by the action of the spring 55, the part 58 will fall away from the forward end of the beam 3 and permit full and complete downward movement thereof. The hopper 50 is normally held up by one arm of an angle lever 59, the other arm of which is operable by the cam 60 on the shaft 13. When the cam has made a certain amount of movement on the rotation of the shaft 13, the horizontal arm of the angle lever 59 falls away from the lower end of the rod 57 and permits the lowering of the hopper 50. The construction just outlined, except the upper end of the rod 57 which is provided with the cross piece 58, is fully set forth and illustrated in the application No. 311,157 to which I have hereinbefore referred, and in itself forms no part of the present invention, for which reason a more detailed description thereof is not necessary.

In Fig. 7 I have shown two wheels $15^a$, the arms of which are adapted to overlap as the wheels turn, the latter being arranged side by side or in parallelism. These wheels are intergeared, for which purpose their shafts have intermeshing gears $15^b$, one of the shafts having a pulley $15^c$ to be driven by a belt as $15^d$. The two wheels as they rotate prevent excessive delivery of material from the hopper 14 and also insure an even feed therefrom of such material.

What I claim is:

1. The combination of a valve having a shank, shoulders on the shank, a lever to engage the shoulders to open and close the valve, means for operating the lever to give the valve a partial movement, and independent means for operating the lever to give the valve a second movement.

2. The combination of a valve provided with a shank, adjustable shoulders on the shank, a lever to engage the shoulders to open and close the valve, and means for operating the lever.

3. The combination of a valve, a lever for operating the valve to move the same in opposite directions, an arm to oscillate the lever, means for oscillating said arm, and independent means for moving the lever, said arm serving to operate the lever to give the valve a primary movement in one direction, and said independent means by operating against the lever serving to give the valve a secondary movement in the same direction.

4. The combination of a valve, a lever to operate the valve, a shaft loosely carrying said lever, an arm fastened to said shaft, means for turning the shaft to cause said arm to engage the lever in a direction to give to the valve an initial movement, and independent means for acting against said lever to give to the valve a secondary movement.

5. The combination of a valve, a lever to operate the valve, a shaft loosely carrying said lever, an arm fastened to said shaft, means for turning the shaft to cause said arm to engage the lever in a direction to give to the valve an initial movement, and a yieldingly mounted member for engaging the lever to give to the valve a secondary movement.

6. The combination of a valve provided with a stem, adjustable collars on said stem, a lever to act against the collars for moving the valve in opposite directions, a shaft loosely carrying said lever, an arm fixed to said shaft and provided with adjustable projections for acting against said lever, means for positively turning said shaft to cause the lever to operate the valve, and independent means acting against the lever to operate the valve.

7. The combination of a valve, a lever for operating the valve, a shaft loosely carrying said lever, independent devices for operating against the lever to cause the valve to have two distinct movements in the same direction, a second valve, and means for causing the second valve to move toward the first valve during the first stage of motion of said first valve.

8. The combination of a valve, a lever to operate the valve, a shaft loosely carrying said lever, means for turning the shaft, means connected with said shaft for operating against the lever to cause the same to give to the valve a primary closing movement, independent means for giving to the valve a secondary closing movement, a second valve, and means connected with said shaft for moving the second valve toward the first valve on the first stage of movement of said first valve.

9. The combination of a weighing device including a bucket, stream supplying means for the bucket, a valve for controlling the flow of the stream, said valve having a shank, shoulders on the shank, a lever to engage the shoulders to open and close the valve, a shaft upon which the lever is loosely carried, an arm fastened to the shaft and arranged to act against the lever, means for operating the shaft to cause the arm to operate the lever and apply a primary closing movement to the valve, and means for acting against the lever to complete the closing movement of said valve.

10. The combination of a weighing device including a bucket, stream supplying means for the bucket, a valve for controlling the flow of the stream and provided with a shank having shoulders, a lever to engage the shoulders to close and open the valve, a shaft loosely carrying said lever, an arm fixed to said shaft and provided with adjustable means to operate against the latter, means for turning the shaft to cause the arm to act against the lever in order to impart an initial closing movement to the valve, and yieldable means acting directly against the lever to complete said closing movement.

11. The combination of a weighing device including a bucket, stream supplying means for the bucket, a valve for controlling the flow of the stream and provided with a shank having two adjustable shoulders thereon, a lever forked to straddle the shank and to operate against said shoulders, a shaft loosely carrying said lever, an arm fastened to the lever and provided with a fork having screws, the lever having a projection to be engaged by the screws, means for operating the shaft to cause the arm to operate against the lever, and thereby impart an initial closing movement to the valve, and a movable member provided with a spring to act directly against the lever to complete the closing movement of the valve.

12. The combination of a valve, a lever supported for oscillation between its ends, and two independently operative members for successively engaging said lever at opposite sides of its center of motion to cause the lever to operate said valve.

13. The combination of a valve, a lever supported for oscillation between its ends and having a projection at one side of its center of movement, means for engaging the lever at the opposite side of its center of movement in a direction to cause it to operate the valve, a forked arm between the branches of which said projection is disposed, and means for operating said arm to cause it to act against the lever to also operate said valve.

14. The combination of a valve, a lever and an arm, the lever being operable by the arm and relatively to the latter to cause the action of the valve, means for operating said arm to secure said function, and independent means for acting against the lever to secure independent motion of the valve.

In testimony whereof I have hereunto set my hand in presence of two subscribing witnesses.

FREDERICK J. HEYBACH.

Witnesses:
HEATH SUTHERLAND,
ROBERT EVERETT.